March 25, 1930.  M. A. SUAREZ  1,751,666
LICENSE CARD HOLDER
Filed June 6, 1928
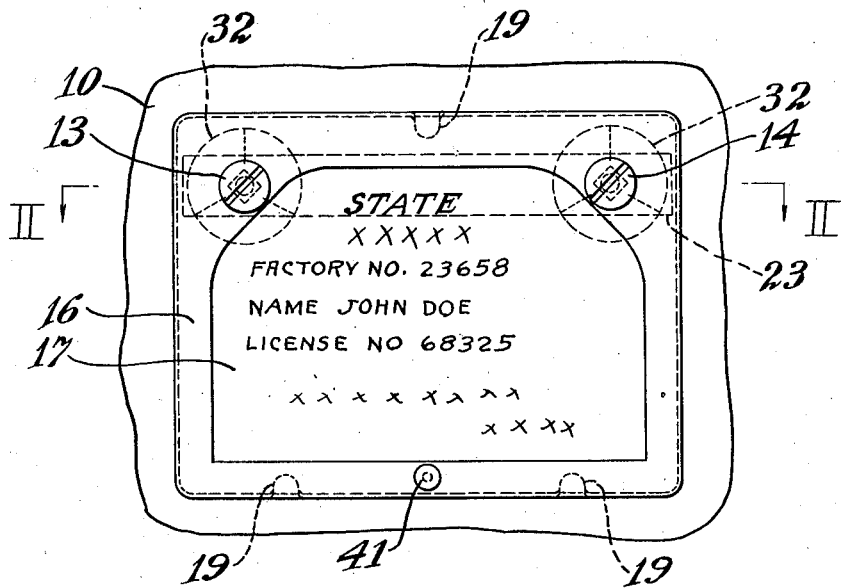
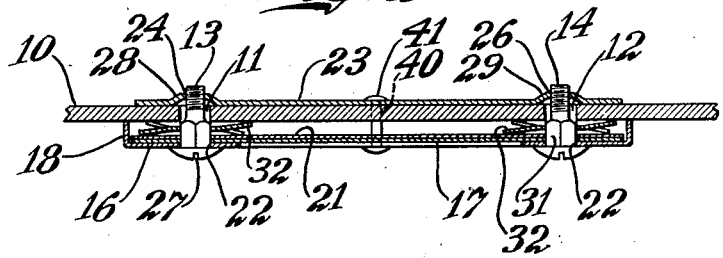
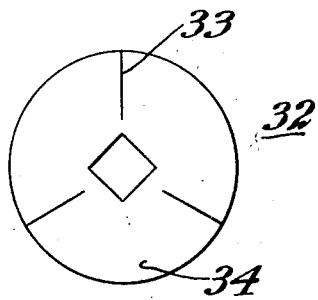
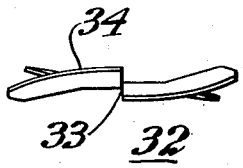
Inventor
M.A. Suarez
By Johnston & Jennings
Attorneys Patented Mar. 25, 1930

1,751,666

UNITED STATES PATENT OFFICE

MURRELL A. SUAREZ, OF BIRMINGHAM, ALABAMA

LICENSE-CARD HOLDER

Application filed June 6, 1928. Serial No. 283,393.

My invention relates to card holders, more particularly to a holder for automobile license cards and has for its object the provision of a device of the character designated which shall be simple of design and easy of application, and which shall be effective to prevent removal of a card therefrom without mutilation of the card.

A further object of my invention is to provide a license card holder which may be readily assembled with the card in place on a panel, such as the instrument board of an automobile, and which, upon disassembly, multilates the card before it can be removed.

In order to minimize theft of automobiles, the laws in some States require that the owner's license card shall be permanently carried on the automobile, in plain view for inspection, and that the card shall not be removable from the automobile without multilation. While various devices for accomplishing this purpose have heretofore been proposed, they have been unduly expensive to manufacture and have required, in some instances at least, the services of a skilled workman to install them.

In accordance with my invention, I have provided a license card holder embodying a minimum of parts and one which may be readily installed by the average automobile owner without the necessity of special tools. Briefly, my invention comprises a frame for holding the card, which frame is secured to a suitable panel on the automobile by means of bolts passing through the frame and the card. Carried by the bolts and rotatable therewith are cutting knives, so arranged that they do not mutilate the card when being turned to tighten the bolts, but which operate to mutilate the card when being turned in a direction to loosen them and remove the card.

Apparatus embodying features of my invention is illustrated in the accompanying drawings, forming a part of this application, wherein Fig. 1 is a view in front elevation of my improved device attached to an automobile;

Fig. 2 is a sectional view taken along the line II—II of Fig. 1;

Fig. 3 is a view in front elevation of one of the card mutilating cutters; and

Fig. 4 is an edge view of the same.

Referring now to the drawings for a better understanding of my invention, I show a panel 10, such as the instrument board of an automobile. The panel 10 is provided with a pair of spaced holes 11 and 12 through which pass fastening bolts 13 and 14, the latter being employed to secure my improved license holder frame 16 to the panel.

The frame 16 is rectangular in shape, conforming to the standard shape of automobile license cards and is provided in its front with a transparent window 17. The edges of the frame 16 are flanged all around as at 18 and the frame is provided with a plurality of clips 19 to temporarily hold a license card 21 in place, when the apparatus is being assembled. The card 21 bears whatever information is required by the laws in the locality in which it is used and is accordingly not set forth in detail.

The upper corners of the frame 16 are each provided with a bolt hole 22 through which the bolts 13 and 14 pass. Arranged to the rear of the panel 10 is a common locking bar 23 having threaded holes 24 and 26 into which the bolts 13 and 14 are screwed. This common locking bar 23 prevents disassembly of the device except by unscrewing the bolts 13 and 14 and the latter are each provided with a kerf 27 for use of a screw driver in assembling and disassembling the device. In order to aid assembly of the device in a position where the holes 24 and 26 can not be seen, I provide the locking bar 23 with depressions 28 and 29 surrounding the holes 24 and 26, which depressions aid in entering the bolts in the holes.

Each of the bolts 13 and 14 is provided with a square shank 31 upon which fits a mutilating cutter 32. Each of the cutters 32 comprises a circular disk having slits 33 extending radially from the outer edge inwardly, forming segments 34. Each of the segments 34 is twisted with respect to the plane of the disk and in a direction such that, when the associated bolt is being tightened down, the leading edge of the segment is not in contact with the card 21 and the trailing edge slides across the card without cutting it. Upon reverse rotation of the bolt, or when loosening it, the leading edge of the segment digs into the card and tears it.

In assembling the device the card is placed in the frame 16 and temporarily held in place by the clips 19. Holes are provided in the upper corners of the card to match up with the holes 22 in the frame and the bolts 13 and 14 are passed through the frame 16, the window 17, and the card 21. The cutters 32 are next threaded onto the bolts 13 and 14 and, while the locking bar 23 is held in place to the rear of the holes 11 and 12, the bolts 13 and 14 are tightened down with a screw driver. While the bolts 13 and 14 are being tightened down, as already explained, the leading edges of the segments 34 of the cutters 32 are away from the card so that the card is not cut. Upon reverse rotation of the bolts, to disassemble the apparatus, or in an attempt to remove the card, the segments 34 dig into the card and mutilate it.

As an additional safe guard, a series of aligned holes 40 may extend through the lower portion of the device, the card, and through the panel 10 for the reception of a soft metal seal 41 which is flattened over at both ends to seal it.

From the foregoing, it will be apparent that I have devised an improved license card holder which is simple of design and economical of mannufacture and which may be readily assembled and disassembled on an automobile without the use of special tools or the services of a skilled workman.

While I have shown my invention in but one form, it will be obvious to those skilled in the art that it is not so limited but is susceptible of various changes and modifications without departing from the spirit thereof, and I desire therefore that only such limitations shall be placed thereupon as are imposed by the prior art or as are specifically set forth in the appended claims.

What I claim is:

1. In a device of the character described, a frame, a card in the frame, a panel member, means for attaching and detaching the frame member to and from the panel, and means operable by detachment of the frame member for mutilating the card.

2. In a device of the character described, a frame, a card in the frame, a panel member, means passing through the card for attaching and detaching the frame member to and from the panel, and means operable by detachment of the frame member for mutilating the card.

3. In a device of the character described, a panel, a frame fitting against the panel, a card in the frame, fastening bolts extending through the frame and the card for attaching the frame to the panel, and cutter means carried by the bolts and operable to mutilate the card upon rotation of the bolts to detach the frame.

4. In a device of the character described, a panel, a frame fitting against the panel, a card fitting in the frame, bolts passing through the frame and the card to fasten the frame to the panel, rotatable cutter means carried by the bolts to mutilate the card when turning the bolts to unfasten the frame, and a common locking bar for the bolts to prevent unfastening thereof except by turning the bolts.

5. In a device of the character described, a frame, a card in the frame, a panel to which the frame is secured, bolts passing through the frame, the card and the panel to hold them in assembled relation, and cutter means carried by the bolts between the card and the panel and ineffective to mutilate the card when tightening the bolts down but effective to mutilate the card when loosening the bolts.

6. In a device of the character described, a frame, a card in the frame, a panel to which the frame is secured, bolts passing through the frame, the card and the panel to hold them in assembled relation, cutter means carried by the bolts between the card and the panel and ineffective to mutilate the card when tightening the bolts down but effective to mutilate the card when loosening the bolts, and a common locking bar for the bolts.

7. In a device of the character described, the combination of a card, a mutilating cutter comprising a metal plate slit radially from the outer edge inwardly and having its segments inclined to the plane of the plate and bearing against the card, and a fastening bolt for turning the cutter and extending through the card.

8. In a device of the character described, the combination of a card, a mutilating cutter comprising a metal plate slit radially from the outer edge inwardly and having its segments inclined to the plane of the plate and bearing against the card, said cutter having a squared hole through its center, and a fastening bolt having a shank fitting in the hole and extending through the card.

9. In a device of the character described, the combination of a card, a pair of fastening bolts having squared shanks and extending through the card, mutilating cutters fitting on the shanks to rotate with the bolts, said mutilating cutters bearing against the card and permitting tightening the bolts without mutilation of the card and a common locking bar having threaded holes in which the bolts fit.

10. In a device of the character described, the combination of a card, a pair of bolts having squared shanks and extending through the card, a circular metal disk slit from the outer edge inwardly and having a squared hole fitting over the shank of each bolt, the segments of said disk being inclined to the plane of the disk to form cutting knives which bear against the card, and a common locking bar for the bolts and having threaded holes in which the bolts fit.

11. In a device of the character described, the combination of a card, a pair of bolts having squared shanks and passing through the card, a circular metal disk slit from the outer edge inwardly and having a squared hole fitting over the shank of each bolt, the segments of said disks being inclined to the plane thereof to form cutting knives which bear against the card, the inclination of said segments being such that the knives are ineffective to cut the card when tightening the bolts and effective to cut the card when loosening the bolts, and a common locking bar for the bolts and having threaded holes in which the bolts fit.

In testimony whereof I affix my signature.

MURRELL A. SUAREZ.